(12) United States Patent
    Kreml et al.

(10) Patent No.: US 12,663,133 B2
(45) Date of Patent: Jun. 23, 2026

(54) LIGHT GUIDE FOR A MOTOR VEHICLE ILLUMINATION DEVICE FOR IMPROVING LIGHT HOMOGENEITY

(71) Applicant: PO Lighting Czech, s.r.o., Senov u Noveho Jicina (CZ)

(72) Inventors: Tomas Kreml, Senov u Noveho Jicina (CZ); Jiri Martoch, Senov u Noveho Jicina (CZ); Radim Siuda, Senov u Noveho Jicina (CZ)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 19/073,666

(22) Filed: Mar. 7, 2025

(65) Prior Publication Data

US 2025/0321372 A1    Oct. 16, 2025

(30) Foreign Application Priority Data

Mar. 8, 2024    (EP) ..................................... 24162326

(51) Int. Cl.
    *F21S 41/24*        (2018.01)
    *B60Q 1/04*        (2006.01)
    (Continued)

(52) U.S. Cl.
    CPC ................ *F21S 41/24* (2018.01); *B60Q 1/04* (2013.01); *F21S 41/143* (2018.01);
    (Continued)

(58) Field of Classification Search
    CPC ... B60Q 1/04; F21S 41/24; F21S 41/25; F21S 41/143; F21S 41/151; F21S 41/153; F21S 41/663
    (Continued)

(56) References Cited

U.S. PATENT DOCUMENTS

2013/0051014 A1*  2/2013  Sikkens .................. F21V 13/04
                                                        362/235
2015/0241616 A1*  8/2015  Bungenstock ....... G02B 6/0018
                                                        362/511
(Continued)

FOREIGN PATENT DOCUMENTS

DE        102018207063 A1 * 11/2019 ............ F21S 41/153
DE        202023104597 U1    9/2023
(Continued)

OTHER PUBLICATIONS

Written Opinion of Foreign Priority Document (Year: 2024).*
European Patent Office, European Search Report for European Patent Application No. EP24162326 dated Jul. 12, 2024.

*Primary Examiner* — Keith G. Delahoussaye

(57) ABSTRACT

A light guide (26) for an illuminating device, the illuminating device adapted for vehicle exteriors and including an array of light sources (22), the light guide (26) including: a guide body (30) extending along a horizontal axis (X-X); and a plurality of guide fingers (32) intended to guide the light emitted by the array of light sources (22) and extending from the guide body (30) in such a way that they are aligned along the horizontal axis (X-X), each guide finger (32) extending between a light input end (32I) receiving at least part of the light emitted by the light sources (22) and a light output end (32O), adjacent guide fingers (32) being joined by a junction (38) integral with each of the adjacent guide fingers (32), and at least one of the junctions (38) includes a protrusion (40) extending towards the light input ends (32I).

13 Claims, 5 Drawing Sheets

(51) Int. Cl.

| | |
|---|---|
| *F21S 41/143* | (2018.01) |
| *F21S 41/151* | (2018.01) |
| *F21S 41/25* | (2018.01) |
| *F21S 41/663* | (2018.01) |
| *F21V 8/00* | (2006.01) |
| *F21W 102/14* | (2018.01) |

(52) U.S. Cl.
CPC ........... *F21S 41/151* (2018.01); *F21S 41/663* (2018.01); *G02B 6/0045* (2013.01); *G02B 6/0068* (2013.01); *G02B 6/0073* (2013.01); *F21S 41/25* (2018.01); *F21W 2102/14* (2018.01)

(58) Field of Classification Search
USPC ......................................................... 362/511
See application file for complete search history.

(56) References Cited

U.S. PATENT DOCUMENTS

| | | | |
|---|---|---|---|
| 2018/0328562 A1* | 11/2018 | Taudt | ...................... F21S 41/25 |
| 2021/0180760 A1 | 6/2021 | Aubert | |
| 2021/0381668 A1* | 12/2021 | Iwasaki | ................... F21S 41/25 |
| 2023/0174183 A1 | 6/2023 | Martiska | |
| 2024/0110680 A1 | 4/2024 | Nam | |

FOREIGN PATENT DOCUMENTS

| | | | |
|---|---|---|---|
| EP | 4191127 A1 | 6/2023 | |
| WO | 2020043443 A1 | 3/2020 | |

* cited by examiner

20

28    26    22    24

26

X-X    B    34    32    32I 38    36    30    ZC    38    40B    32O

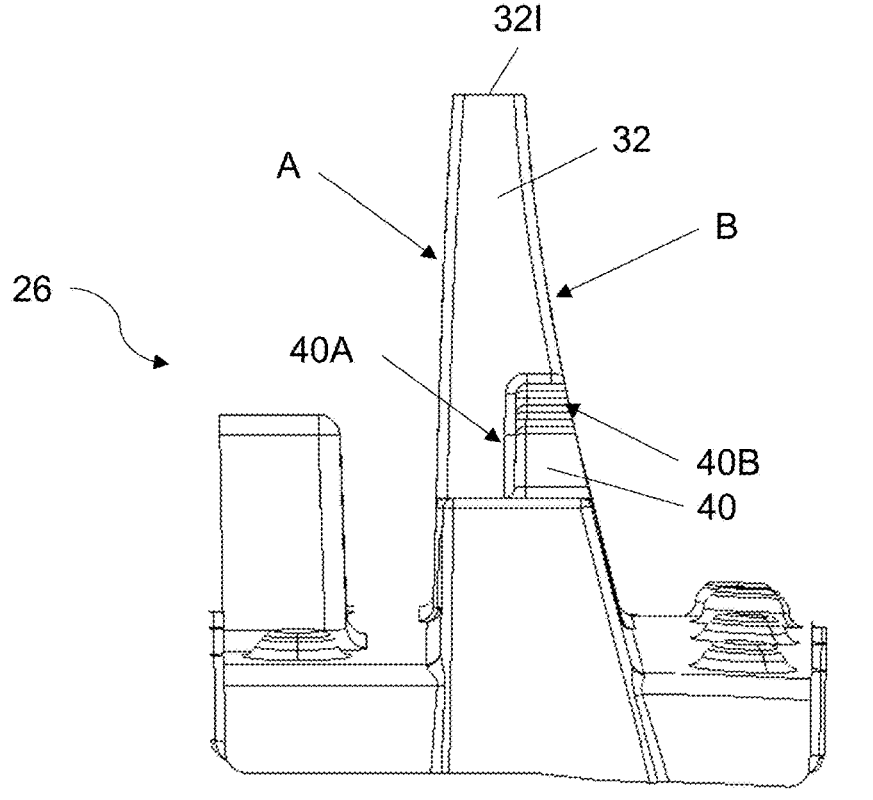
Fig. 5
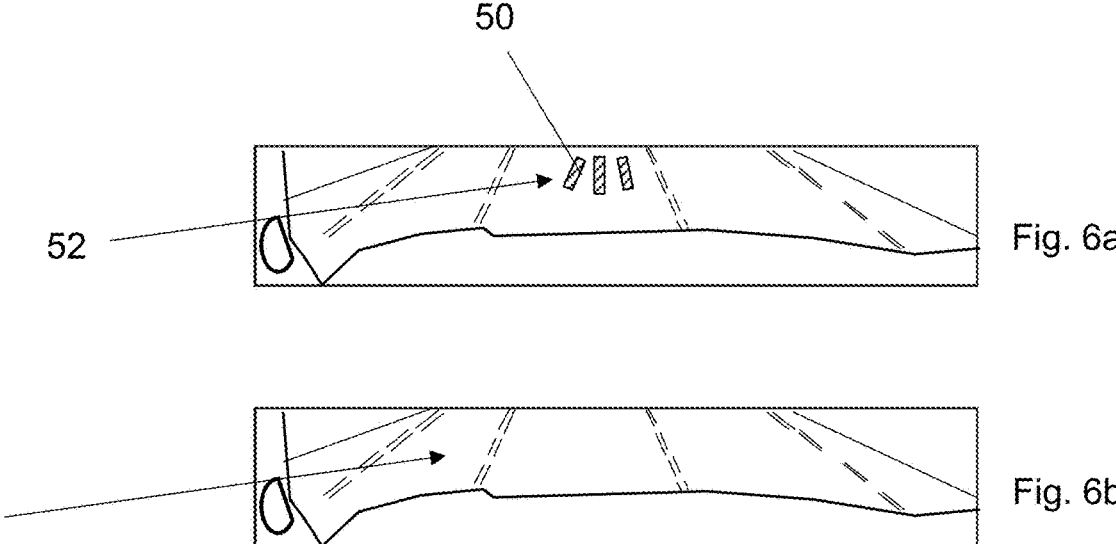
Fig. 6a
Fig. 6b

LIGHT GUIDE FOR A MOTOR VEHICLE ILLUMINATION DEVICE FOR IMPROVING LIGHT HOMOGENEITY

FIELD

The invention relates to the domain of the automotive industry, and particularly to a vehicle lamp. In particular, the invention relates to light module for a motor vehicle, the light module comprising a plurality of light guides and generating a pixelated light beam with a homogenous appearance.

BACKGROUND

Many car models now include light modules capable of generating a pixelated beam, the projection of which forms an image composed of lighting units, also called "pixels". Said units are organized into at least one horizontal and/or vertical array, and each of the lighting units may be activated selectively.

For instance, the pixelated beam may be required to provide an adaptive road function known as ADB, for "Adaptive Driving Beam". This function enables a beam to be formed with a shadowed area arranged at the level of an incoming vehicle and/or at the level of a vehicle ahead. The aim of this function is to provide better visibility for the driver of the vehicle, while avoiding dazzling the driver of the incoming vehicle and/or the vehicle ahead.

Known from DE 10 2008 036 193 A1 is an illumination device for vehicles that has a first light module for producing a low-beam light distribution and a second light module for producing a high-beam light distribution, each light module comprising numerous semiconductor-based light sources arranged as a matrix. Combining the light distributions from the first and second modules allows for the focus of the light distribution to be changed as desired. However, it turns out that the total light distribution, which is superimposed from the first light distribution and the second light distribution, has relatively large light-intensity gradients in a border area between the first light distribution and the second light distribution, which are undesirable. In other words, the edges in this border area are very visible and can be projected when using the low beam, which cause an undesired image in the shape of an A to be projected on the road. This is a source of discomfort or distraction for the driver.

In order to avoid such inhomogeneities in the border area between a first light distribution caused by the first light module and a second light distribution caused by the second light module, DE 10 2015 104 514 proposes to arrange an intermediary optics unit between the primary optics unit and the secondary optics unit of the second light module. Said intermediary optics unit is designed as a lens with scattering elements configured as buffer elements, configured in such a way that a light-intensity gradient of the second light distribution gradually diminishes in at least one of a vertical and horizontal direction in a lower subarea in which the first light distribution of the first light module connects or overlaps with an upper subarea. Another way of reducing such inhomogeneities in the border area is to provide a filter between the first light module and the second light module.

However, the addition of an intermediary optics unit complexifies the lamp module and in turn increases its overall manufacturing and maintenance costs and also requires to provide for additional spare parts.

SUMMARY

There is therefore a need to provide a vehicle lamp that would reduce, if not avoid, inhomogeneities in the border area between a first light distribution caused by the first light module and a second light distribution caused by the second light module in a simpler, cheaper way.

To that end, the invention concerns a light guide for an illuminating device adapted for vehicle exteriors comprising an array of light sources, comprising:

a guide body extending along a horizontal axis, a plurality of guide fingers intended to guide the light emitted by the array of light sources and extending from the guide body in such a way that they are aligned along said horizontal axis, each guide finger extending between a light input end receiving at least part of the light emitted by the light sources and a light output end, adjacent guide fingers being joined by a junction integral with each of the adjacent guide fingers, characterized in that at least one of the junctions comprises a protrusion extending towards the light input ends of the guide fingers.

Owing to the particular shape of the light guide, and in particular the at least one protrusion located at a junction between the guide fingers, the zone where the protrusion is located will release more light. This will provide a bigger horizontal spread of segments, which in turn will improve the homogeneity of the light distribution. As a consequence, the edges in the border area will be less visible, and the undesired A-shaped image will not be projected on the road. This removes a source of discomfort or distraction for the driver. Hence, the invention provides a solution to the aforementioned problem by giving a particular shape to the light guide, which does not require an additional intermediary optics unit such as a filter. It is therefore much cheaper to manufacture and allows to save on maintenance and logistical costs.

Preferably, each guide finger is delimited, between said input and output ends, by a guide first surface and a guide second surface, the guide first surfaces of all guide fingers being contained within a single surface and the guide second surfaces being contained within a single surface. This avoids the appearance of any step or teeth on the projected image.

Preferably, the guide first surface and the guide second surface are respectively a top surface and a bottom surface of the light guide. In the present context, the terms top and bottom apply when the illumination device is in its mounted position on the vehicle. Advantageously, the single surface within which the guide first surfaces of all guide fingers and/or the guide second surfaces are contained in is a continuous surface. A continuous surface is meant as a surface that may be curved but has a continuous curvature. A continuous curve is a curve that may be derived, i.e. which does not contain any sharp angle.

Even more advantageously, the single surface within which the guide first surfaces of all guide fingers and/or the guide second surfaces are contained are substantially flat surfaces.

Preferably, a protrusion is also delimited, between said input and output ends, by a protrusion first surface that is substantially parallel to the first surface of an adjacent guide finger and an opposite protrusion second surface, the protrusion first surface being on the same side as the guide first surface and the protrusion second surface being on the same side as the guide second surface, the protrusion first surface or the protrusion second surface being, respectively, substantially parallel to the first surface or the second surface of an adjacent guide finger, preferably both the first and the second protrusion surface being respectively parallel to the first and the second surface of an adjacent guide finger. This particular arrangement simplifies the manufacturing process of the light guide in view of the tooling. In addition, the protrusion and guide fingers being parallel makes the overall appearance of the light beam smoother. Advantageously, the protrusion second surface and the guide second surface of the adjacent guide fingers are contained within a same surface. This avoids the appearance of any step or teeth on the projected image.

According to a particular embodiment, the protrusion forms a shoulder extending from the junction towards the light input end. This allows to create an enlargement of the bottom part of the projected light image, which in turn creates a fuzziness of the borders in the projected image, which avoids the creation of the sharp "A" shape on the road.

Preferably, the shoulder extends along an axis that is substantially parallel to the axis according to which an adjacent guide finger extends.

According to another particular embodiment, the protrusion includes a ramp linking the protrusion first surface to the protrusion second surface.

Preferably, the ramp has a curvature that varies between the guide first surface to the guide second surface. This particular arrangement simplifies both the design and manufacturing process of the light guide.

Preferably, the ramp has a continuous surface having a continuous curvature. This particular arrangement also simplifies both the design and manufacturing process of the light guide.

Advantageously, the ramp has a curvature that increases from the first surface towards the second surface.

According to a preferred embodiment, the guide fingers extend from the guide body by protruding from a common surface of the guide body.

According to a particular embodiment well suited to the case where a correction is required in a central area of the projected light, at least one junction comprising a protrusion is located in a zone of the light guide body that is central with respect to the horizontal axis.

Preferably, to simplify its structure, the light guide is shaped as a plate having cross-section in the shape of a T, the guide body forming the base of the T.

The invention also concerns a vehicle lamp module comprising:

an array of light sources, preferably light-emitting diodes,
a primary optics unit located downstream of the light sources comprising a light guide, and
a secondary optics unit located downstream of the primary optics unit and receiving the light guided by the light guide of the primary optics unit, wherein the primary optics unit comprises a light guide according to the invention.

The invention also concerns an automotive vehicle lamp comprising a vehicle lamp module according to the invention.

BRIEF DESCRIPTION OF THE FIGURES

The invention will be better understood upon reading the following description, which is given only as an example and is made with reference to the attached drawings in which:

FIG. 5 is a view of the cross-section of the primary optics unit of FIG. 1 along line V-V;

FIGS. 6a and 6b provide a comparison of the visible effect on the road obtained without any light module, with a state-of-the-art filter and with a light module according to the invention;

DETAILED DESCRIPTION

Figure 1:
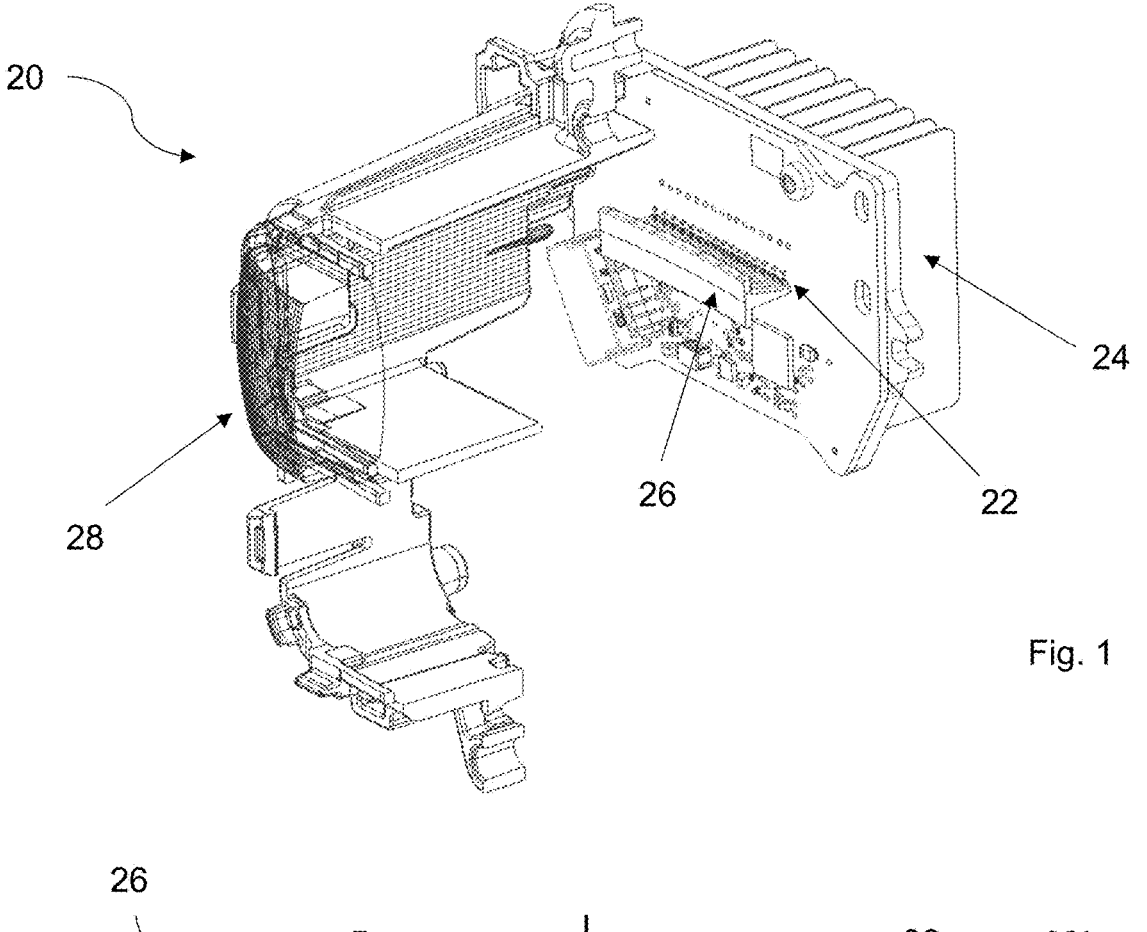
FIG. 1 is a perspective view of a light box including a light module according to a first embodiment of the invention.
Figure 2:
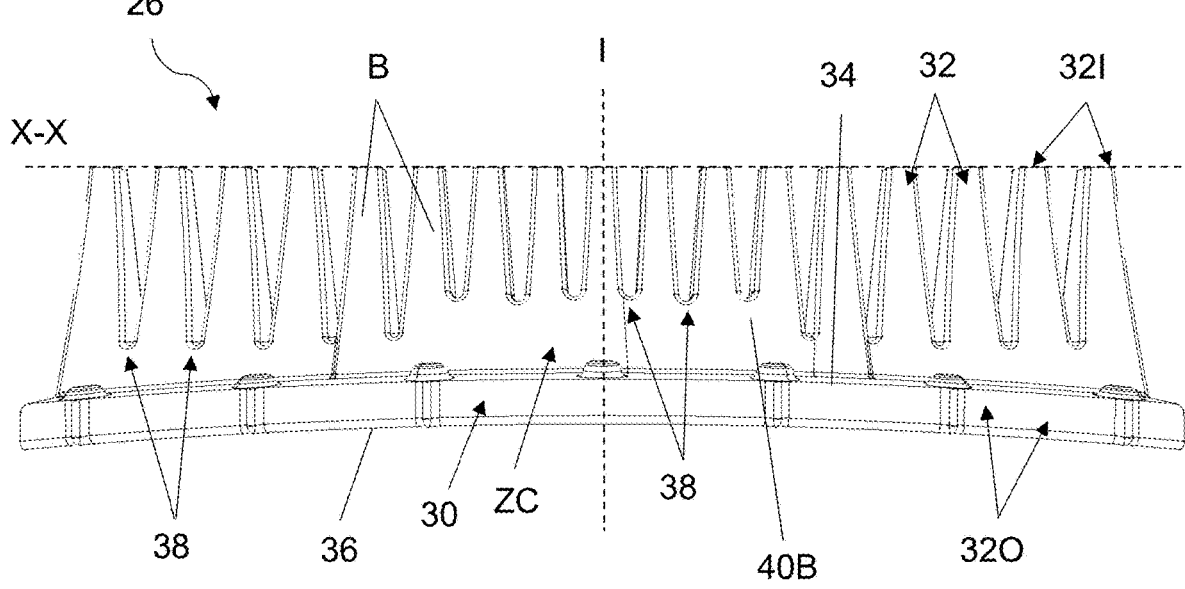
FIG. 2 is a top view of the primary optics unit of the light module of FIG. 1.
Figure 3:
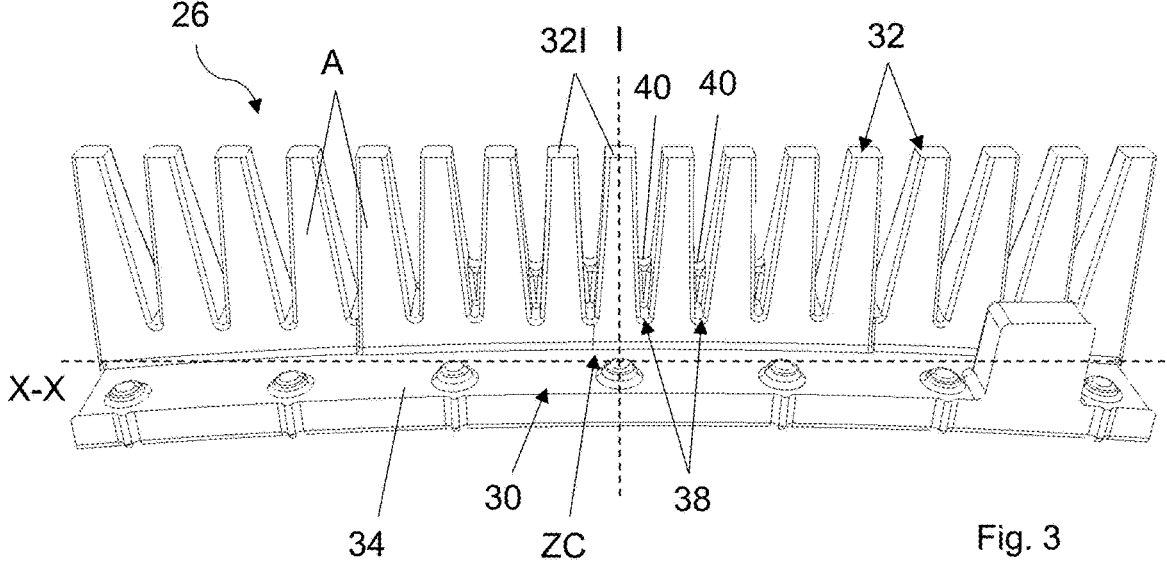
FIG. 3 is a perspective view of the primary optics unit of FIG. 2.
Figure 4:
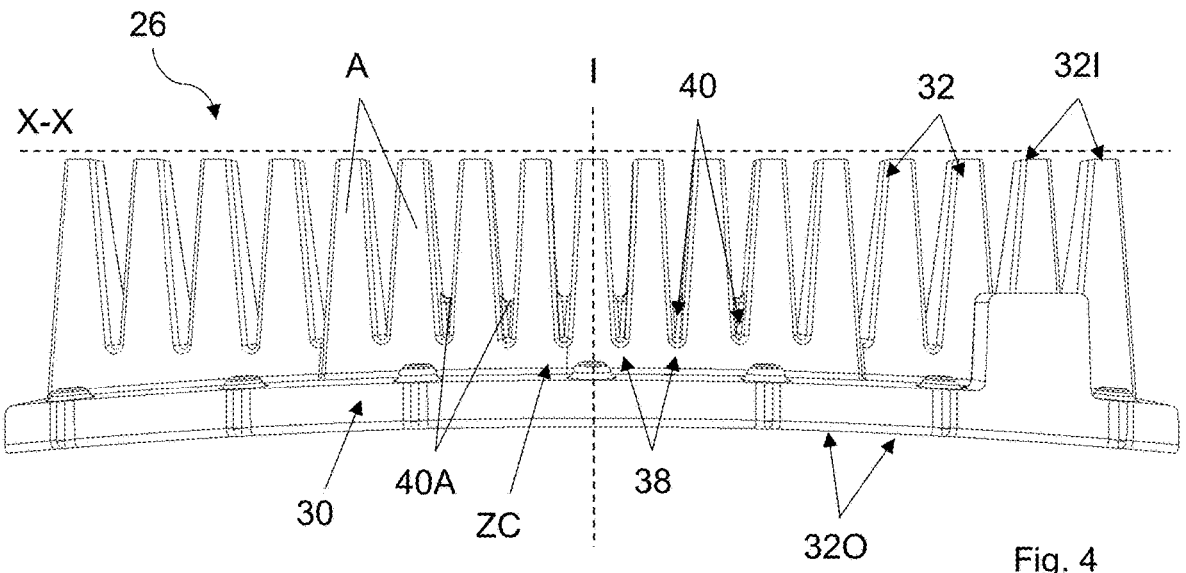
FIG. 4 is a bottom view of the primary optics unit of the light module of FIG. 2.
Figures 7, 8, 9:
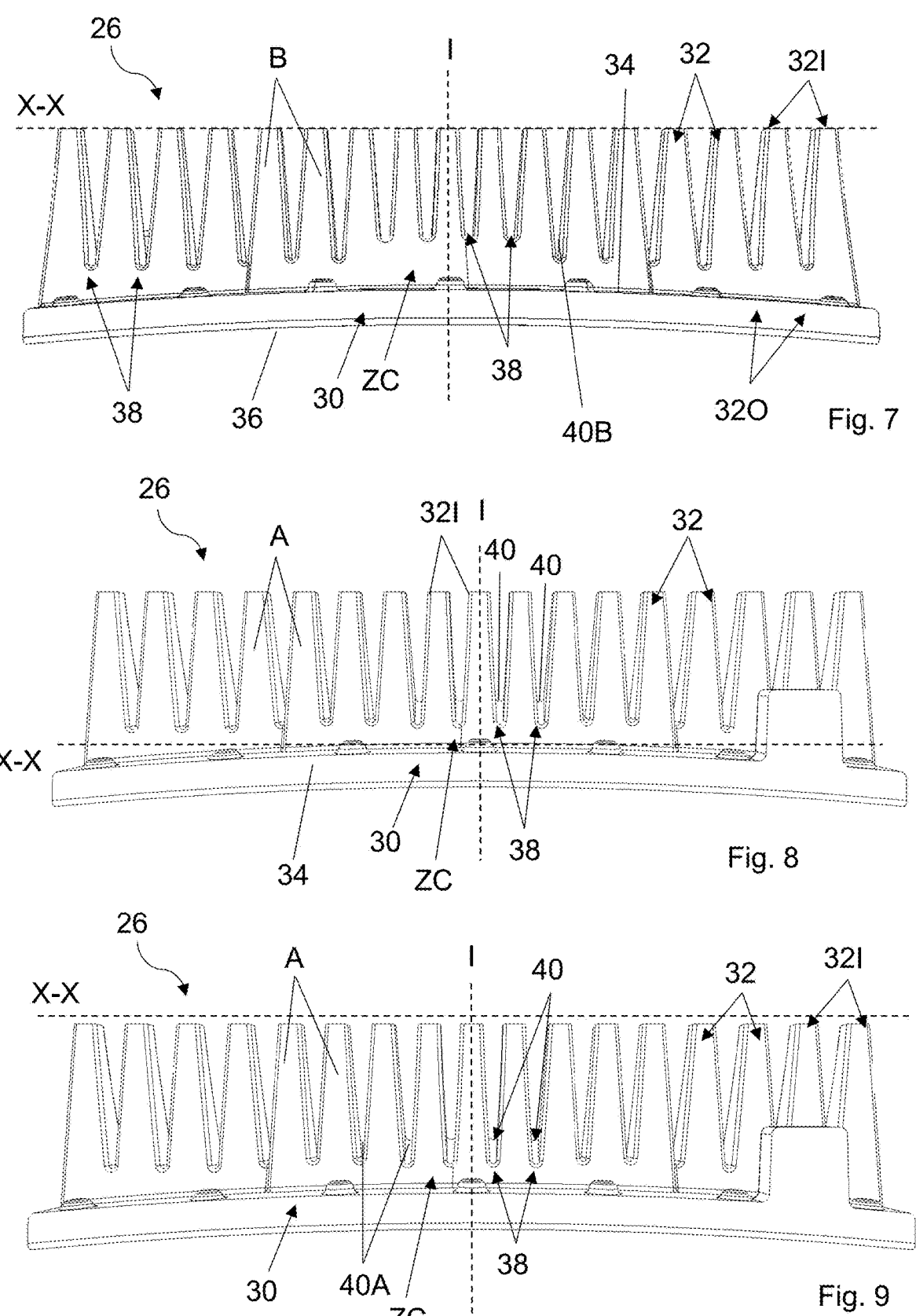
FIG. 7 is a top view of a primary optics unit of a light module according to a second embodiment of the invention.
FIG. 8 is a perspective view of the primary optics unit of FIG. 7.
FIG. 9 is a bottom view of the primary optics unit of the light module of FIG. 7.

With reference to FIG. 1, a vehicle lamp module 20 according to an embodiment of the invention comprises an array of light sources 22, preferably light-emitting diodes (LEDs), a primary optics unit 24 located downstream of the light sources 22 comprising a light guide 26, and a secondary optics unit 28 located downstream of the primary optics unit 24. The secondary optics unit 28 can for example be a light box.

In particular, the vehicle lamp module 20 may be an automotive vehicle lamp such as an LED headlamp, and more particularly an LED matrix headlamp.

FIGS. 2 to 5 show a first embodiment of the light guide 26. Light guide 26 comprises a guide body 30 extending along a horizontal axis X-X from which guide fingers 32 extend longitudinally in the upstream direction. In the present example, the guide fingers 32 extend from the guide body 30 by protruding from a common surface 34 of the guide body, or first face 34.

The guide body 30 comprises a second face 36, opposite the first face 34, which is positioned facing the secondary optics unit 28. The second face 36 is gently curved away from said secondary optics 28. In other words, the guide body 30 of light guide 26 is concave.

The guide fingers 32 are intended to guide the light emitted by the array of light sources 22 (not shown on FIGS. 2 to 5) and extend from the guide body 30 in such a way that they are aligned along the horizontal axis X-X.

Each guide finger 32 extends between a light input end 32I receiving at least part of the light emitted by the light sources 22 and a light output end 32O, which faces the secondary optics unit 28. Light sources 22 may be arranged facing the input diopters of some or all of the guide fingers 32.

Preferably, to simplify its structure, the light guide 26 is shaped as a plate having cross-section in the shape of a T, the guide body 30 forming the base of the T. More specifically, in the example shown on the Figures, the guide fingers 32 are arranged in a comb shape.

More precisely, in the illustrated example, the guide fingers 32 are seventeen in number and are arranged on either side of an axis I which corresponds to the geometrical centre of the guide body 30. This axis I may be chosen to be the optical axis I of the primary optics unit.

The first half of the guide fingers 32 is located on the left of the optical axis I with respect to the direction of emission of the light and the second half of the guide fingers 32 is located on the right of the optical axis I with respect to the direction of emission of the light. In other words, the first half and the second half of the light guides are mirror-symmetric with respect to the optical axis I.

Unless specified otherwise, the terms "left" and "right" are defined with respect to the direction of propagation of the light within the lamp module 20 and outside said module 20. In this case, given the arrangement of the lamp module 20, the terms "left" and "right" correspond to the left and the right, respectively, of FIGS. 2 to 5 and 7 to 9.

Additionally, in the illustrated example, each guide fingers 32 has a variable cross section in the direction of its length. In this case, the cross section of each guide fingers 32 increases from input end 32I to output end 32O.

Preferably, each guide finger 32 is delimited, between the input 32I and output ends 32O, by a guide first surface A and an opposite guide second surface B. The guide first surfaces A of all guide fingers being contained within a single surface and the guide second surfaces are contained within a single surface.

Adjacent guide fingers 32 are joined to each other by a material junction 38, integral with each of the adjacent guide fingers 32.

At least one of the junctions 38 between guide fingers 32 comprise a protrusion 40 extending towards the light input ends 32I of the guide fingers.

In the first embodiment shown on FIGS. 2 to 5, the light guide 26 comprises six protrusions 40.

In this particular example all protrusions 40 are located within a same zone of the guide body 30. To be more precise, all protrusions 40 are located in a zone ZC of the guide body 30 that is central with respect to the horizontal axis X-X. The central zone ZC is centred around optical axis I. It includes seven guide fingers 32.

Five guide fingers 32 are located on the left of the central zone ZC and five guide fingers 32 are located on the right of the central zone ZC. These numbers can vary and the central zone ZC may include more or less guide fingers 32.

Naturally, the number of protrusions 40 can vary, as long as there is at least one protrusion 40. The protrusions 40 can also be located outside of the central zone ZC of the guide body 30. Moreover, the protrusions 40 can be unevenly distributed and do not have to be located in a single, continuous zone of the guide body 30.

Preferably, a protrusion 40 is delimited, between said input 32I and output ends 32O, by a protrusion first surface 40A and an opposite protrusion second surface 40B, the protrusion first surface A being on the same side as the guide first surface A and the protrusion second surface B being on the same side as the guide second surface B. The first protrusion surface 40A or the second protrusion surface 40B is respectively substantially parallel to the first surface A of an adjacent guide finger or the second surface B of an adjacent guide finger. Having at least one protrusion surface being parallel to its respective guide finger surface makes the appearance of the light image smoother and simplifies the manufacturing of the light guide 26.

In the embodiments shown on the Figures in particular, the protrusion first surface 40A is substantially parallel to the first surface A of an adjacent guide finger and the protrusion second surface 40B is substantially parallel to the second surface B of an adjacent guide finger 32. This arrangement makes the manufacturing of the light guide 26 even simpler.

Advantageously, the protrusion second surface 40B and the guide second surface B of the adjacent guide fingers are contained within a same surface. Even more preferably, as can be seen on FIG. 2, the protrusion second surface 40B of each protrusion 40 are joined to form a single surface such that the guide second surface and the protrusion second surfaces 40B are one and the same in the central zone ZC of the guide body. Owing to the particular shape of the light guide 26, and in particular the protrusions 40 located at the junctions 38 between the guide fingers 32, the central zone ZC will release more light, which will provide a bigger horizontal spread of segments, which in turn will improve the homogeneity of the light distribution. This is turn makes the edges in border area less visible, and the undesired A-shaped image 50 that was projected on the road 52 with light guides of the prior art, shown on FIG. 6A, is not visible anymore as shown on FIG. 6B. This removes a source of discomfort or distraction for the driver.

In this first embodiment shown on FIGS. 2 to 5, each protrusion 40 forms a shoulder extending from the junction 38 towards the light input end 32I, as can be best seen on FIG. 5.

As can be seen on FIG. 5, the protrusion first surface 40A is offset to the first surface B of the adjacent guide finger 32. The protrusion second surface 40A is also offset to the second surface B of the adjacent guide finger.

Preferably, the shoulder 40 extends along an axis that is substantially parallel to the axis according to which an adjacent guide finger extends, which on the examples shown on the Figures corresponds to axis I.

In another embodiment shown on FIGS. 7 to 10, the light guide 26 includes just four protrusions 40, which are once more located in the central zone ZC of the guide body 30.

The protrusions 40 include a ramp 54 linking the protrusion first surface 40A to the protrusion second surface 40B.

Preferably, the ramp 54 has a curvature that varies between the guide first surface A to the guide second surface B.

Preferably, said ramp 54 has a continuous surface having a continuous curvature.

Figure 10:
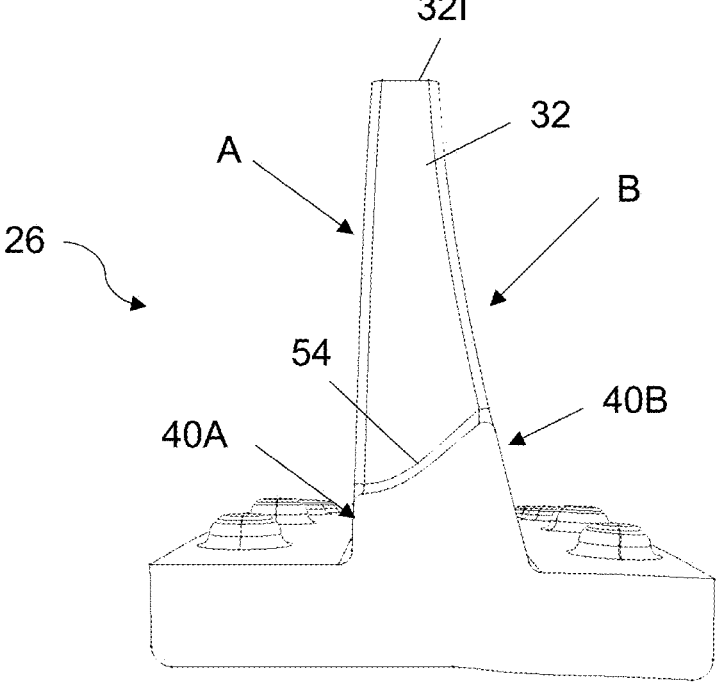
FIG. 10 is a view of the cross-section of the primary optics unit of FIG. 1 along line X-X.

As can be best seen on FIG. 10, in this particular embodiment, the curvature of the ramp 54 increases from the protrusion first surface 40A towards the protrusion second surface 40B. In this particular example, the ramp 54 increases exponentially.

In a variant that is not shown, the ramp first surface 40A can also offset to the first surface B of the adjacent guide finger 32, and the ramp second surface 40A can also offset to the second surface B of the adjacent guide finger.

The invention is not limited to the presented embodiments and other embodiments will clearly appear to the skilled person. Any combination of the aforementioned embodiments or variants is for example explicitly envisioned.

REFERENCES LIST

20: Vehicle lamp module
22: Light sources
24: Primary optics unit
26: Light guide
28: Secondary optics unit
30: Guide body
32: Guide fingers
B: Guide finger second surface
32I: Light input end
32O: Light output end
A: Guide finger first surface
34: First face of the guide body
36: Second face of the guide body
38: Junctions
40: Protrusions 40B: Protrusion second surface
40A: Protrusion first surface
50: A-shaped image
52: Road
54: Ramp
X-X: Horizontal axis
I: Optical axis

The invention claimed is:

1. A light guide (26) for an illuminating device adapted for vehicle exteriors and comprising an array of light sources (22), the light guide (26) comprising:

a guide body (30) extending along a horizontal axis (X-X), and a plurality of guide fingers (32) configured to guide the light emitted by the array of light sources (22) and extending from the guide body (30) in such a way that they are aligned along said horizontal axis (X-X), each guide finger (32) extending between a light input end (32I) receiving at least part of the light emitted by the light sources (22) and a light output end (32O), adjacent guide fingers (32) being joined by a junction (38) integral with each of the adjacent guide fingers (32), wherein at least one of the junctions (38) comprises a protrusion (40) extending towards the light input ends (32I) of the guide fingers (32), and wherein each guide finger (32) is delimited, between said input (32I) and output (32O) ends, by a guide first surface (A) and a guide second surface (B), the guide first surfaces (A) of all guide fingers (32) being contiguous with a single surface, and the guide second surfaces (B) of all guide fingers (32) being contiguous with a single surface.

2. The light guide (26) according to claim 1, wherein the protrusion (40) is delimited, between said input (32I) and output (32O) ends, by a protrusion first surface (40A) and an opposite protrusion second surface (40B), the protrusion first surface (40A) being on the same side as the guide first surface (A) and the protrusion second surface (40B) being on the same side as the guide second surface (B), wherein the protrusion first surface (40A) or the protrusion second surface (40B) being, respectively, substantially parallel to the first surface (A) or the second surface (B) of an adjacent guide finger (32), or both the protrusion first surface (40A) and the protrusion second surface (40B) being respectively parallel to the first surface (A) and the second surface (B) of an adjacent guide finger.

3. The light guide (26) according to claim 1, wherein the protrusion (40) is also delimited, between said input (32I) and output (32O) ends, by a protrusion first surface (40A) that is offset to the first surface (A) of an adjacent guide finger (32) and a protrusion second surface (40B) that is offset to the second surface (B) of an adjacent guide finger (32).

4. The light guide (26) according to claim 2, wherein the protrusion second surface (40B) and the guide second surface (B) of the adjacent guide fingers (32) are contiguous with a same surface.

5. The light guide (26) according to claim 2, wherein the protrusion includes a ramp (54) linking the protrusion first surface (40A) to the protrusion second surface (40B).

6. The light guide (26) according to claim 5, wherein the ramp (54) has a curvature that varies between the guide first surface (A) to the guide second surface (B).

7. The light guide (26) according to claim 5, wherein the ramp (54) has a continuous surface having a continuous curvature.

8. The light guide (26) according to claim 5, wherein the ramp (54) has a curvature that increases from the first surface (40A) towards the second surface (40B).

9. The light guide (26) according to claim 1, wherein the guide fingers (32) extend from the guide body (30) by protruding from a common surface (34) of the guide body.

10. The light guide (26) according to claim 1, wherein the at least one junction (38) comprising the protrusion (40) is located in a zone (ZC) of the light guide body (30) that is central with respect to the horizontal axis (X-X).

11. The light guide (26) according to claim 1, wherein the light guide (32) is shaped as a plate having cross-section in the shape of a T, the guide body (30) forming the base of the T.

12. A vehicle lamp module (20) comprising:

an array of light sources (22), wherein the array of light sources (22) comprise light-emitting diodes, a primary optics unit (24) located downstream of the light sources (22) comprising the light guide (26), and a secondary optics unit (28) located downstream of the primary optics unit (24) and receiving the light guided by the light guide (26) of the primary optics unit (24), wherein the light guide (26) is according to claim 1.

13. A light guide (26) for an illuminating device adapted for vehicle exteriors and comprising an array of light sources (22), the light guide comprising:

a guide body (30) extending along a horizontal axis (X-X), and a plurality of guide fingers (32) intended to guide the light emitted by the array of light sources (22) and extending from the guide body (30) in such a way that they are aligned along said horizontal axis (X-X), each guide finger (32) extending between a light input end (32I) receiving at least part of the light emitted by the light sources (22) and a light output end (32O), adjacent guide fingers (32) being joined by a junction (38) integral with each of the adjacent guide fingers (32), wherein at least one of the junctions (38) comprises a protrusion (40) extending towards the light input ends (32I) of the guide fingers (32), wherein the protrusion (40) forms a shoulder extending from the junction (38) towards the light input end (32I), and wherein the shoulder (40) extends along an axis (I) that is substantially parallel to the axis according to which an adjacent guide finger (32) extends.

* * * * *